(12) United States Patent
Ayres

(10) Patent No.: US 12,408,601 B1
(45) Date of Patent: Sep. 9, 2025

(54) SUBSURFACE IRRIGATION STAKE

(71) Applicant: Jay D. Ayres, Woodlake, CA (US)

(72) Inventor: Jay D. Ayres, Woodlake, CA (US)

( * ) Notice: Subject to any disclaimer, the term of this patent is extended or adjusted under 35 U.S.C. 154(b) by 84 days.

(21) Appl. No.: 18/407,423

(22) Filed: Jan. 8, 2024

(51) Int. Cl.
*A01G 25/06* (2006.01)

(52) U.S. Cl.
CPC .................................. *A01G 25/06* (2013.01)

(58) Field of Classification Search
CPC ............................ A01G 25/06; A01G 25/16
See application file for complete search history.

(56) References Cited

U.S. PATENT DOCUMENTS

| | | | | |
|---|---|---|---|---|
| 953,080 | A * | 3/1910 | Wiggins ................ | E02B 13/00 405/48 |
| 2,893,334 | A * | 7/1959 | Snyder .................. | A01G 29/00 251/324 |
| 4,904,112 | A * | 2/1990 | McDonald ............. | A01G 25/06 405/36 |
| 6,964,124 | B2 * | 11/2005 | Brode, III ............. | A01N 35/06 43/132.1 |
| 8,065,832 | B2 * | 11/2011 | King ..................... | A01G 29/00 47/79 |
| 8,978,296 | B2 | 3/2015 | Zinger | |
| 9,055,718 | B2 | 6/2015 | Geerligs | |
| 9,068,409 | B2 | 6/2015 | Mohamed | |
| 9,334,693 | B2 | 5/2016 | Walton et al. | |
| 9,609,812 | B2 | 4/2017 | Ciudaj | |
| 9,709,471 | B2 | 7/2017 | Riess et al. | |
| D816,439 | S | 5/2018 | Crook et al. | |
| 10,010,031 | B1 | 7/2018 | Liu et al. | |
| 10,091,955 | B2 | 10/2018 | Crook et al. | |
| 10,328,663 | B2 | 6/2019 | Lortscher et al. | |
| 10,462,984 | B1 * | 11/2019 | Koziak ................. | A01G 29/00 |
| 2011/0056128 | A1 * | 3/2011 | King ..................... | A01G 29/00 47/48.5 |
| 2018/0035621 | A1 * | 2/2018 | Allen ..................... | A01G 29/00 |
| 2022/0287253 | A1 * | 9/2022 | Summers ............... | A01G 25/06 |
| 2025/0031636 | A1 * | 1/2025 | Ross ..................... | A01G 25/06 |

* cited by examiner

*Primary Examiner* — Benjamin F Fiorello
(74) *Attorney, Agent, or Firm* — Richard A. Ryan

(57) ABSTRACT

A subsurface irrigation stake to deliver irrigation water to soil below a ground surface where a plant is or will be located to better direct the water to the root zone of the plant and reduce loss of water due to evaporation. The stake has a stake body, a pressure regulator and a conduit connector. The stake body has a head at an upper end of the stake and an elongated tubular shaft extending to a lower end of the stake. The shaft has one or more auger flights to screw the shaft into the soil and a plurality of flow apertures that discharge water into the soil. The regulator is connected to the head of the stake body. In one configuration, the regulator is removably connected to the head. The conduit connector, which is connected to or integral with the regulator, connects to a water distribution line.

20 Claims, 8 Drawing Sheets

SUBSURFACE IRRIGATION STAKE

BACKGROUND OF THE INVENTION

A. Field of the Invention

The present invention relates generally to apparatuses and systems that are beneficially utilized to with agricultural irrigation to improve plant growth and reduce water consumption. More particularly, the present invention relates to such apparatuses and systems that are structured and arranged to more efficiently and effectively provide water to plants that are growing in an agricultural field by directly supplying water to the ground at the plants and reducing the evaporation of water. Even more particularly, the present invention relates to such apparatuses and systems that direct irrigation water below the grown at the plants to reduce water loss due to evaporation and improve the deep growth of plant roots.

B. Background

Irrigation systems have generally been in use for thousands of years to deliver water to trees, vines and other plants, including crops such as vegetable plants, fruit plants and forage crops (collectively, all such trees, vines and plants are herein referred to as "plants"). As well known to those skilled in the art, older irrigation systems generally comprise a plurality of canals, trenches, furrows and/or other open delivery conduits that are utilized to deliver water to the plants in a field having a plurality of such plants. One of the major problems with such irrigation systems is the loss of water to evaporation. A relatively recent improvement for irrigation systems, but one which has been in use for many years, are systems which use a plurality of closed conduits, such as pipes or the like, to deliver water to or very near the specific location of each plant. In general, closed conduit irrigation systems reduce the loss of irrigation water that would otherwise occur through evaporation, which losses are inherent when using open delivery conduits, by more specifically directing the water to the plant or plants where desired.

Closed conduit irrigation systems generally have a water distribution apparatus, which is typically a manifold or the like, that connects to a plurality of distribution lines to distribute water from a source of water, which may be a well or other source, to the plants through the water pipes. As well known in the art, the water distribution apparatus is utilized to prevent non-selective flow disparity between the distribution lines, which would otherwise result from pressure disparity between the various pipes and water flow lines to ensure the delivery of water to the plants that are reflective of that which is the most beneficial for the plants. In one configuration of a closed conduit irrigation system, the pipes that deliver water directly to the plant have an open end at the plant to flow water to or around the plant. Most often, however, the irrigation system has a flow control device, such as a sprinkler head, valve or the like that directs water to where it can most benefit the plant.

One type of closed conduit irrigation system is commonly referred to as a drip irrigation system. In one embodiment of such systems, the flow control device is a single drip emitter placed at the end of the water pipe that is selected so as to provide the desired amount of water to the plant. Typically, however, drip irrigation systems utilize a plurality of drip emitters that are arranged along the distribution line at the general position of each plant to be irrigated thereby. Water flows from a manifold or other water distribution apparatus through the distribution lines towards the plants to be watered, exiting the lines at the end of the distribution lines or through the emitters placed along the line. For drip irrigation systems, the typical distribution line is a linear tubing made out of polyethylene, polyvinylchloride (PVC) and like materials. As well known in the art, drip irrigation systems generally better control the use and placement of water to a plant than non-drip irrigation systems by precisely placing the water at the plant. In addition, most drip irrigation systems are specifically configured to allow for irrigation with very low flow rates. As a result, drip irrigation systems generally require somewhat less water than most non-drip irrigation systems, which makes the system particularly popular in the more arid regions of the world.

As an alternative to drip emitters, many drip irrigation systems use relatively low volume, spray-type sprinklers, which are commonly referred to as microsprinklers or microsprayers, to spray water on and/or around the plants. As with drip emitters, pressurized water for the microsprinklers is typically delivered through a plurality of distribution lines. Compared to drip emitters, microsprinklers generally provide for much higher flow rates and they can irrigate a much wider area around the plant, which is particularly important for trees or other types of vegetation that have relatively large root systems. Compared to conventional larger flow rate sprinklers, microsprinklers are much more energy and water efficient because they generally deliver less water at lower pressure with the water being directed more specifically at the location where it is needed, which can also provide for more precise micronutrient delivery. Microsprinklers provide a spray of water that has droplets which are much smaller than the droplets provided by conventional sprinklers, resulting in more of the water being absorbed into the soil and less of the water creating runoff problems. Microsprinklers are commonly utilized in under canopy irrigation in fruit orchards, vineyards and green houses. One disadvantage of microsprinklers is that the spray of water also waters weeds or other undesirable vegetation around the desired plant. Another disadvantage is that the spray can result in relatively higher humidity levels around the plants, which is harmful to some plants.

When using drip emitters, it is well known in the art that the pressure in the drip lines must be controlled so that each of the drip emitters get, within a selected range, the correct water pressure so as to deliver the right flow rate and the right pattern. If all emitters experience nearly the same water pressure, they will all output the same (correct) amount of water, resulting in a more uniform irrigation and crop production. Unfortunately, this can be difficult to achieve due to line losses, including elbows, tees and other fittings, elevation changes, lateral lines and other issues. To control water pressure through a drip irrigation system, most operators use pressure regulators. A water irrigation pressure regulator is, in effect, an automatic valve that continually adjusts the size of its opening to keep water pressure immediately downstream of the regulator at a fixed, preset value regardless of upstream pressure (within a range). Pressure at the regulator's input may vary, but the pressure at its output stays constant at a desired, presumably beneficial, level. The pressure regulator lets the operator choose points within the drip irrigation system where the variations are removed and pressure is known and held relatively constant to maintain a consistent, high irrigation performance. For drip irrigation systems, there are generally three types of pressure regulators that are commonly used, namely, diaphragm valve pressure regulators, spring-type pressure regulators and pressure compensating emission devices. Typically, for best performance, a pressure regulator is located as close as possible to each of the drip emitters.

Two issues that are important and relevant to all types of irrigation systems, including drip irrigation systems, are: (1) how to reduce the amount of water that is lost to evaporation; and (2) how to deliver water to the portion of the plant that most needs the water, the roots, without causing the roots to grow at or near, or even above, the surface of the ground. While closed conduit irrigation systems generally have significantly less water lost to evaporation than open conduit irrigation systems, there is still an issue with regard to evaporation losses. Although the water is delivered to the area of the plant by closed conduit, once the water gets to or near the plant it flows out an opening in the conduit or the flow control device, such as an emitter, a sprinkler or a microsprinkler, located at or near the plant. Naturally, the water that flows or is sprayed out of the conduit, whether directly or through an emitter, is subject to partial evaporation loss before it can be taken in by the soil and, eventually, the plant. In addition to evaporation losses, the placement of water at or near the top of the ground around the plant will result in some of the water being taken up by weeds and other undesirable vegetation. Water that gets to the plant must be taken up by the plant through its roots, which grow downward or away from the top of the soil. The water placed at or near the top of the ground surface must work its way down through the soil to the roots to benefit the plant. Unfortunately, often the result is that the roots will start growing upward to the upper portion of the soil where the water has saturated the soil. In some circumstances, the roots will grow above the soil. As well known, the growth of the roots near or above the surface of the ground is unwanted.

To reduce evaporation losses and encourage deep root growth, a number of stake or stake-like apparatuses have been developed for use with water irrigation systems, including drip irrigation systems. Typically, such apparatuses have an upper portion that connects to a supply of water and a lower portion that comprises a hollow stake-shaped body with a plurality of openings such that when the apparatus is driven into the ground and connected to the water supply, water from the water supply will flow down into the stake body and out the openings into the soil below the surface of the ground and toward the roots. Although most of these apparatuses connect directly to irrigation pipes and lines, including drip lines, some are configured to receive water from garden hoses, a bucket reservoir or via other water delivery mechanisms. The length of the stake typically ranges between twelve and forty inches and the stake is configured to be pushed or hammered into the ground. One prior art device, referred to as the Drip Screw (a trademark of Drip Screw Inc.), is configured to be inserted into the ground using a driver and socket. To accomplish this, the Drip Screw has an upper portion that is engaged by the socket and plurality of auger flights along the length of the stake body. A drip emitter, which is connected to an irrigation distribution line, connects to the Drip Screw such that water passes down the stake body and into the soil, providing subsurface drip. The Drip Screw, as well as other prior art stake or stake-like apparatuses for delivering water to below the surface of the ground at or near a plant, reduce irrigation losses and deliver the water into the ground at a location that is closer to the roots of the plant being watered.

Despite the prior art apparatuses and systems, what is needed is an improved apparatus and system for watering plants that reduces evaporation and improves the growth of roots below the surface of the ground. The new apparatus and system should be configured to be utilized with a wide variety of different types of irrigation systems, particularly closed conduit irrigation systems such as drip irrigation systems and the like, to more efficiently an effectively water to a plant. The improved apparatus and system should be configured to deliver water to plants from an irrigation system in a manner that improves the growth of the plants, reduces the loss of water due to evaporation and reduces the costs associated irrigating a planted area. More specifically, a new apparatus and system should be configured to effectively and efficiently deliver water to a plant in a manner which reduces water lost due to evaporation and improves deep root growth of the plant. Preferably, such an improved apparatus and system should be relatively inexpensive to manufacture and easy to use so the new apparatus and system can be utilized in a wide variety of irrigation systems.

SUMMARY OF THE INVENTION

The following presents a simplified summary of the disclosure of the present invention in order to provide a basic understanding of the invention to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later.

The use of terms such as "including", "comprising", "having" or "with" and variations thereof herein is meant to encompass the items listed thereafter and equivalents thereof. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element or feature of an element from another. The term "and/or," when used herein with a list of two or more items, means that any one of the listed items can be employed by itself, or any combination of two or more of the listed items can be employed.

The subsurface irrigation stake of the present invention provides the benefits and solves the problems identified above. That is to say, the present invention is directed to a new and improved subsurface irrigation stake which can be utilized with an irrigation system to deliver water to a plant in a manner that will reduce loss of water due to evaporation and improve the growth of roots below the surface of the ground. The new subsurface irrigation stake and system can be beneficially utilized with a wide variety of irrigation systems, particularly closed conduit irrigation systems having pipes, hoses, lines and like conduits, to more efficiently and effectively deliver water to a plant. In a preferred configuration, the new subsurface irrigation stake and system is particularly beneficial for use with drip irrigation systems. When utilized with an irrigation system, the new subsurface irrigation stake will deliver water to a plant in a manner that improves the growth of the plant, reduces the loss of water due to evaporation and reduce the costs associated irrigating a planted area (orchard, field, vineyard and the like). More specifically, the subsurface irrigation stake of the present invention effectively and efficiently delivers water to the subsurface soil near a plant in a manner which reduces water lost due to evaporation and improves deep root growth of the plant. The new subsurface irrigation stake is easy to install into the soil around a plant or plant location. In the preferred embodiments, the new subsurface irrigation stake is relatively inexpensive to manufacture so the new apparatus and system can be utilized in a wide variety of irrigation systems throughout the world.

As will be readily appreciated by persons who are skilled in the relevant art, in a preferred configuration and use of the present invention, the new subsurface irrigation stake of the present invention is inserted into the soil at or near a plant or an area where a plant will be placed, connects to a line or other conduit of an irrigation system, receives water from the irrigation system through the conduit, regulates the pressure of the water at the stake and then directs water down into the stake and out into the soil at the planting area. For ease of installing the new subsurface irrigation stake, the stake body has an upper section that is sized and configured removably attach a pressure regulator and to be engaged by a socket and the lower section has an outer surface with a plurality of auger flights that allow the user to, in effect, screw the lower section of the stake body into the soil so that water can exit the subsurface irrigation stake into the soil through a plurality of openings in the stake body. Using a driver attached to the socket, the user operates the driver to easily, quickly and effectively screw the lower section of the stake body into the soil. The upper section of the new subsurface irrigation stake is structured and configured to allow the user to swap out the regulator to achieve different irrigation line fittings, such as: (1) an in-line coupler to connect two sections of irrigation line together; (2) an end plug to seal off the end of the irrigation line; (3) a tee to join an additional perpendicular channel irrigation line to the subsurface stake; (4) an elbow to change direction, such as a ninety degree elbow to turn a corner ninety degrees, at the stake; and (5) a four-way cross to connect two perpendicular irrigation lines together. As will be readily appreciated by persons who are skilled in the relevant art, the new subsurface irrigation stake can be configured for any size or shape irrigation line, for any depth in the soil, for any water discharge pattern and/or for any desired volume of water discharge.

In one embodiment of the present invention, the subsurface irrigation stake for watering a plant location with water from a source of water generally comprises a stake body, a pressure regulator and a conduit connector. The stake body has an open upper end, a lower end, a head at the upper end of the stake body and an elongated tubular shaft that extends downward from the head to the lower end of the stake body. The shaft has a shaft wall which defines an interior area of the shaft. The head is in fluid flow communication with the interior area of the shaft to define a flow path through the stake body. The shaft is sized and configured to be placed in the soil below the ground surface generally at or near a root zone of the plant, or where a plant will be located, with the head of the stake body being positioned at or above the ground surface. The shaft has a plurality of flow apertures in the shaft wall, with the flow apertures being sized and configured to direct water from the interior area of the shaft to the soil at or near the root zone of the plant. The pressure regulator is attached to or integral with the head of the stake body in fluid flow communication with the interior area of the shaft of the stake body. The pressure regulator is structured and arranged to control the flow of water into the shaft and the soil. The conduit connector, which is attached to or integral with the pressure regulator, is in fluid flow communication with the pressure regulator and the interior area of the shaft so as to connect the source of water to the subsurface irrigation stake. The conduit connector has an engaging section which connects to an irrigation distribution line, such as drip line tubing. When the subsurface irrigation stake is positioned with the shaft in the soil and the conduit connector is connected to the source of water for water to flow through the flow path, the subsurface stake will discharge water from the source of water into the soil below the ground surface so as to better direct water to the root zone of the plant when the plant is at or near the plant location and to reduce loss of water due to evaporation.

In a preferred embodiment, the shaft has an opening at the lower end of the stake body that is in fluid flow communication with the interior area of the shaft so as to discharge water from the source of water into the soil through the opening. Also in a preferred embodiment, the shaft has a plurality of side blocks that are attached to or integral with an outer surface of the shaft wall so as to extend outwardly therefrom. Each one of the side blocks are associated with one of the flow apertures and positioned at the one of the plurality of flow apertures so as to reduce the likelihood that the one of the plurality of the flow apertures will be clogged by the soil when the shaft of the subsurface irrigation stake is screwed into the soil. The preferred embodiment also has one or more auger flights on an outer surface of the shaft wall so as to extend outwardly from the shaft wall, with the one or more auger flights being structured and arranged to allow the shaft of the subsurface irrigation stake to be screwed into the soil below the ground surface. The one or more auger flights can extend from at or near the head to the lower end of the subsurface irrigation stake. Preferably, the head of the stake body has flats on an outer surface thereof that are engaged by a socket, which can be connected to a drill or other powered driver, to rotate the stake body and screw the shaft into the soil.

The head of the stake body has a receiving area, which is defined by the head wall of the head, that is cooperatively configured with the pressure regulator to connect the pressure regulator to the head. In one of the preferred embodiments, the receiving area and the pressure regulator are cooperatively configured for the pressure regulator to be removably connected to the head of the stake body. The outer surface of the pressure regulator can have one or more engaging members on an outer surface of the pressure regulator and an equal number of slots in an interior surface of the head wall, with the engaging members being cooperatively sized and configured with the slots for an engaging member to be received in a slot when the pressure regulator is in the receiving area to join the pressure regulator to the head of the stake body. The head wall of the head of the stake body can have one or more cut-out areas in cooperative arrangement with the engaging member so as to allow the engaging member to be received in the receiving area of the head prior to engagement of the engaging member with the slot in the head wall.

Accordingly, the primary object of the present invention is to provide a new subsurface irrigation stake and system using the same having the various advantages set forth above and elsewhere in the present disclosure and which overcomes the disadvantages and limitations which are associated with presently available subsurface irrigation apparatuses and systems.

It is an important object of the present invention to provide a new and improved subsurface irrigation stake that is structured and arranged to be utilized in an irrigation system, including a drip irrigation system, to better direct water from the irrigation system to the roots of a plant and to reduce the loss of water due to evaporation.

It is also an important object of the present invention to provide a new and improved subsurface irrigation stake that can be easily, quickly and effectively be attached to a distribution line of an irrigation system and installed in the soil around a plant or the location where a plant will be located and to regulate the pressure at the subsurface irrigation stake.

An important aspect of the present invention is that it provides a new subsurface irrigation stake and system using the stake which accomplishes the objectives set forth above and elsewhere in the present disclosure.

Another important aspect of the present invention is that it provides a new subsurface irrigation stake and system using the stake which easily connects to a distribution line in an irrigation system to regulate the water pressure in the distribution line and controllably direct a desired quantity of the irrigation water into the soil below the surface of the ground in order to better improve water delivery to the roots of a plant and to reduce loss of water due to evaporation.

Another important aspect of the present invention is that it provides a new subsurface irrigation stake and system using the stake can be utilized with a wide variety irrigation systems, particularly closed conduit irrigation systems having pipes, hoses, lines or like conduits (including in particular a drip irrigation system) to more efficiently and effectively deliver water to the roots of a plant.

Another important aspect of the present invention is that it provides a new subsurface irrigation stake and system using the stake that effectively and efficiently delivers water to the subsurface soil at or near a plant in a manner which reduces water lost due to evaporation and improves deep root growth of the plant.

Another important aspect of the present invention is that it provides a new subsurface irrigation stake and system using the stake wherein the stake has a stake body with an upper section which removably connects to different types of pressure regulator fittings, such as a tee, cross, elbow, in-line coupling, end plug and the like, and which can be engaged by a driver/socket or like device for ease of installing the new stake into the ground.

Another important aspect of the present invention is that it provides a new subsurface irrigation stake and system using the stake wherein the stake has a stake body with a tubular shaped lower section with a plurality of auger flights and openings on the outer surface of the stake body that are configured to make it easier and faster for the user to direct the lower section of the stake body into the soil at or near a plant or location for a plant and to allow water to flow from the interior or the stake, from an irrigation system, to the soil at or near the location of a plant or a location where a plant will be planted to better direct water to the roots of the plant below the surface of the soil so as to improve water delivery to the plant and reduce loss of water due to evaporation.

Yet another important aspect of the present invention is that it provides a new subsurface irrigation stake which is manufactured of materials and in a manner that results in a relatively low cost subsurface irrigation stake which can be utilized in a wide variety of irrigation systems.

The detailed description set forth below provides a more detailed and specific description that will make reference to the accompanying drawings. The drawings and specific descriptions of the drawings included herewith, as well as any specific or alternative embodiments discussed, are intended to be read in conjunction with the entirety of this disclosure. As will be readily appreciated by persons who are skilled in the art, the new subsurface irrigation stake may be embodied in many different forms and should not be construed as being limited to the embodiments which are set forth herein. Instead, the preferred embodiments set forth below are provided by way of illustration only and so that this disclosure will be thorough, complete and fully convey understanding to those persons who are skilled in the relevant art. As will be readily appreciated by such persons, the present invention resides in the novel features of form, construction, mode of operation and combination of processes presently described and understood by the claims. As such, the detailed description of the invention which follows is presented for purposes of illustrating one or more of the preferred embodiments of the present invention and is not intended to be exhaustive or limiting of the invention. The scope of the invention is only limited by the claims which follow after the detailed discussion.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the subsurface irrigation stake of the present invention, as well as examples of an irrigation system with which the new subsurface irrigation stake may be utilized, persons who are skilled in the relevant art will readily appreciate that the present invention is not so limited, as the system and apparatus of the present invention can be utilized with a variety of different plants, different planting areas (i.e., agricultural area, home, business, park or school) and with more than one subsurface irrigation stake at each of the plant locations or one apparatus watering more than one plant. In addition, the exemplary embodiments of the present invention are shown and described herein with only those components that are required to disclose the present invention. As such, it may be possible that some of the necessary elements for attaching and/or using the present invention are not shown or necessarily described below, but which are well known to persons who are skilled in the relevant art. As will be readily appreciated by such persons, the various elements of the present invention that are described below may take on any form which is consistent with forms that may be understood by a person of ordinary skill in the art having knowledge of irrigation systems and the apparatuses utilized to deliver water to plants in an orchard, field, vineyard or other planting area.

Figure 25:
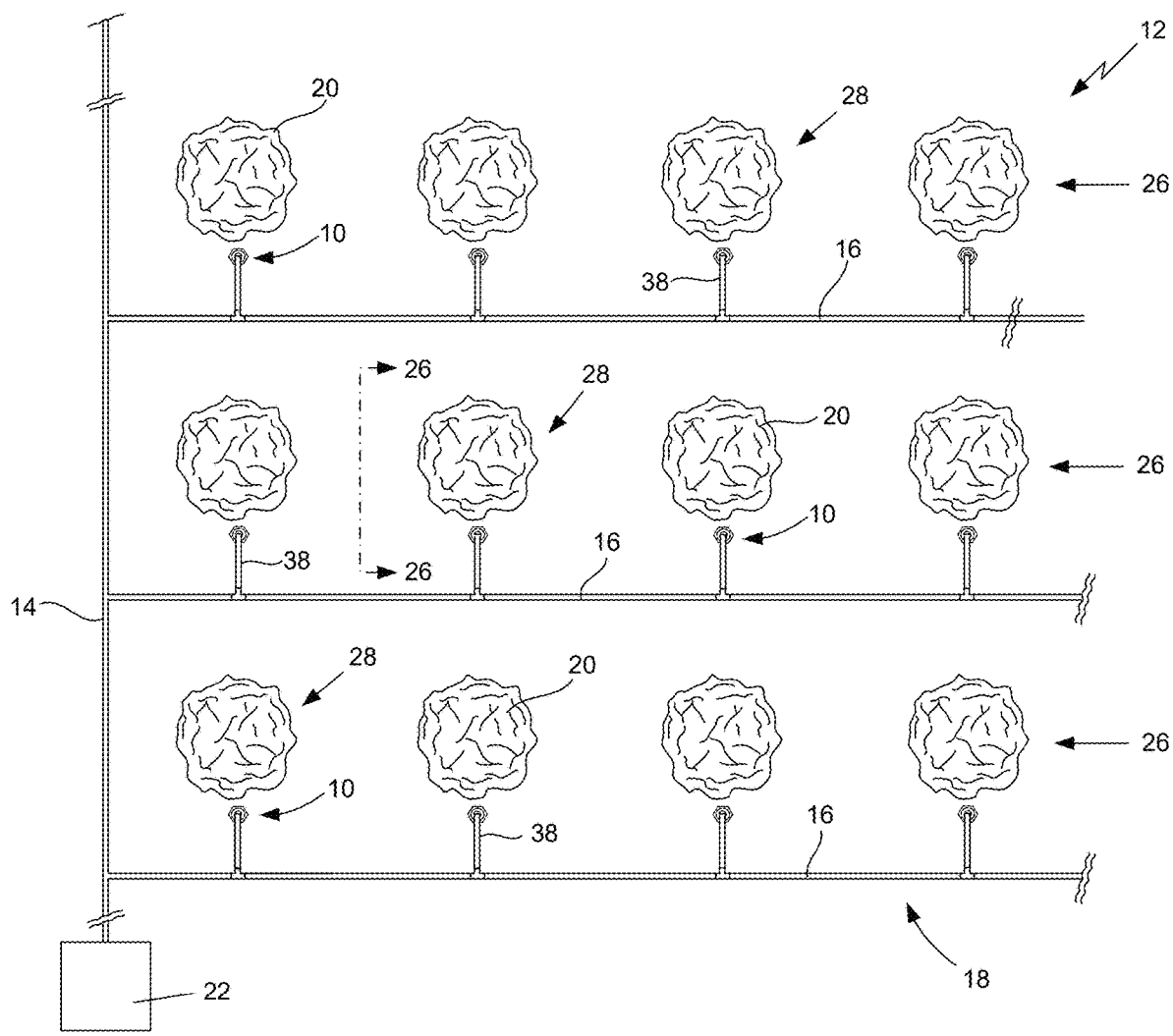
FIG. 25 is a top plan view of an irrigation system configured according to the present invention, showing a plurality of plant locations laid out in rows throughout a planting area (an orchard) with a subsurface irrigation stake of the present invention at each plant location.
Figure 26:
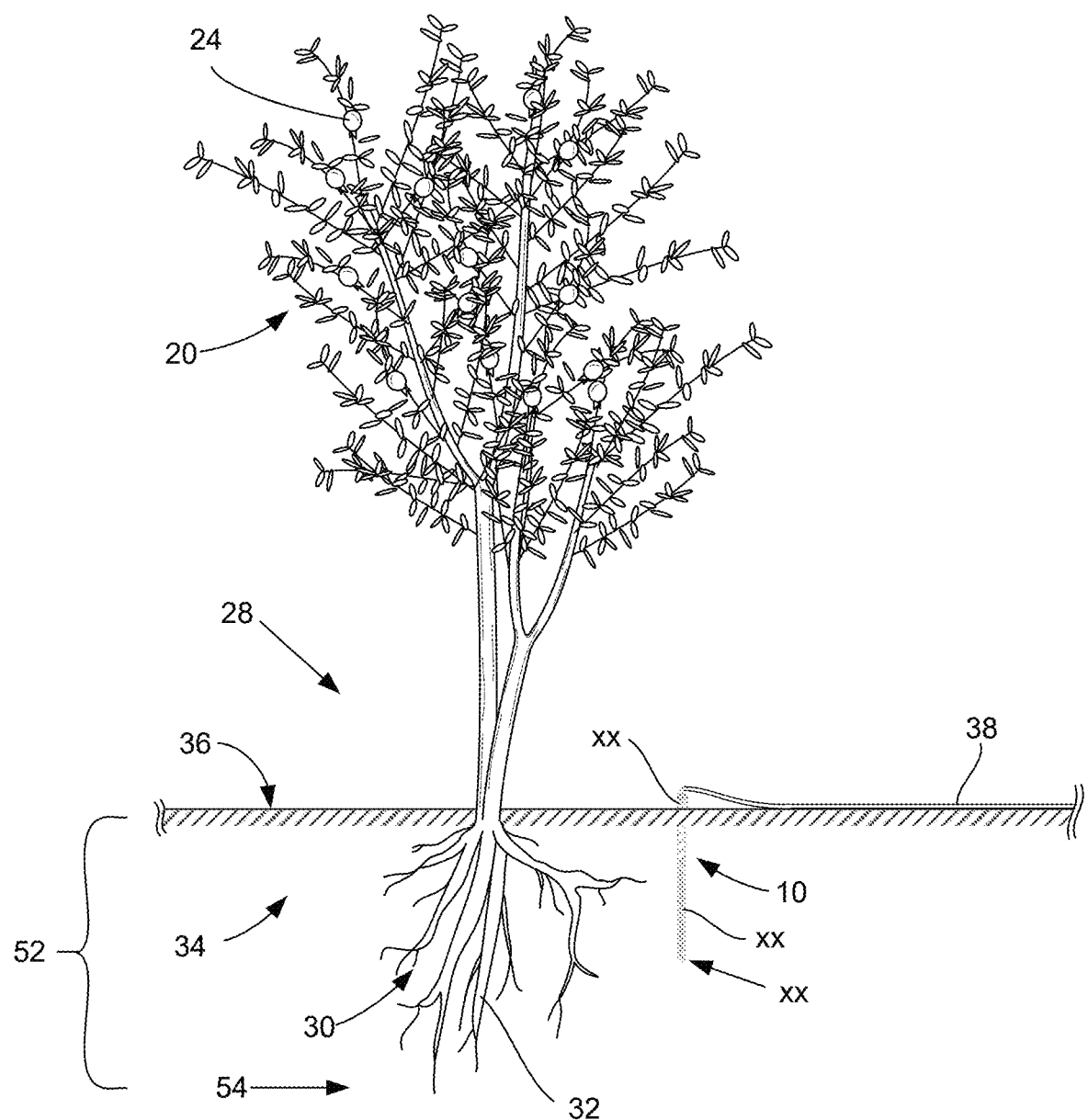
FIG. 26 is a cross-sectional side view of one of the plant locations of FIG. 25 taken at lines 26-26 in FIG. 25 showing an enlarged side vew of the subsurface irrigation stake of FIG. 2 and the roots of the plant, with the subsurface irrigation stake connected to the connecting line of the irrigation system.

A subsurface irrigation stake that is configured pursuant to one or more of the preferred embodiments of the present invention is referred to generally as 10 in FIGS. 1-4 and 25-26. A new plant watering system utilizing the new subsurface irrigation stake 10 that is configured pursuant to one or more of the preferred embodiments of the present invention is referred to generally as 12 in FIGS. 25-26. As set forth in more detail below and shown in FIGS. 25-26, the new subsurface irrigation stake 10 (referred to generally as the "stake") is structured and arranged to be utilized in a plant watering system 12, which can be a drip irrigation system, that generally comprises one or more water distribution lines, such as primary distribution line 14 and the secondary distribution lines 16, spread out in an orchard, field, vineyard or other planting area 18 to deliver water to one or more plants 20 from a source of water 22 to, typically, grow a crop 24 on the plants 20. In FIG. 25, the plants 20 are trees which are positioned in rows 26, such as rows 26a, 26b and 26c, in an orchard (as the planting area 18). Associated with each plant 20 is a plant location 28, which is where the plant 20 is or will be planted and where water will be delivered via distribution lines 14/16. In a typical prior art drip irrigation system, the secondary lines 16 would be placed in each of the rows 26 of plants 20 generally adjacent to at least one side of the plants 20 with either an emitter or microsprinkler, as applicable, positioned inside or attached to the secondary lines 16 at each plant location 28 where a plant 20 is growing or will grow. FIG. 26 shows one of the plants 20 from FIG. 25. The root system 30 of the plant 20 comprises a plurality of roots 32 that extend generally downward through the soil 34 below the ground surface 36 at and near the plant 20. As shown in FIGS. 25-26, a stake 10 is located generally adjacent to the plant 20 for delivering water from the source of water 22 to the root system 30 via a connecting line 38 that connects one of the secondary lines 16, which itself connects to a primary distribution line 14.

In prior art emitter configurations, water from the source of water 20 exits the secondary line 16 through an emitter located in an aperture in either a secondary line 16 or a connecting line 38 onto the ground surface 36 at the plant location 28. Typically, the secondary lines 16 are positioned on top of the ground surface 36 so water will be discharged from the emitter, through the aperture, to percolate into the soil 34 and down to the root system 30 of the plant 20. In prior art microsprinkler configurations, water is sprayed towards the plant 20 from the microsprinkler, positioned in a secondary line 16 or connecting line 38, in a manner which applies water to a relatively larger area of the ground surface 36 than the emitter. As with water which is distributed from emitters, water that is sprayed from a microsprinkler also percolates into the soil 34 and down to the root system 30 of the plants 20. As set forth in the Background, although the use of emitters and microsprinklers to deliver water to plants 20 is generally much more efficient than other prior art methods of watering plants 20, they do have the disadvantage of losing a portion of the water placed on the ground surface 36 to evaporation and generally not encouraging deep root growth. The water lost to evaporation results in less efficient water use and higher watering costs. Water that is placed on the ground surface 38 can cause the roots 32 of the plants 20 to grow generally at or near the ground surface 38 and, in some circumstances, above the ground surface 38. The stake 10 and system 12 of the present invention solves these problems. Specifically, use of the new stake 10 and system 12 will reduce evaporation losses and better encourage deep root growth of the roots 32 of the plants 20, which grow in the root zone 40, which is the area below the plant 20 from the ground surface 36 to a deepest or lowest root depth 42 of the roots 32 of the plant 20. As well known to persons who are skilled in the relevant art, most plants 20 (particularly those grown in an agricultural area (as planting area 18) of the same plants 20) have a relatively common or uniform root zone 40.

As set forth in more detail below, the new system 12 of the present invention utilizes the new stake 10 to discharge water to the plants 20 at or below the root system 30 of the plants 20. An exemplary embodiment of the new plant watering system 12 of the present invention is shown in FIG. 25. The system 12 has a plurality of plant locations 28 that are located in a planting area 18, with each plant 20 having a stake 10 of the present invention associated therewith. As stated above, the stake 10 connects to the secondary lines 16 via the connecting line 38 to hydraulically connect the stake 10 to the primary line 14 and the source of water 22. As will be readily appreciated by persons who are skilled in the relevant art, although the layout of the planting area 18 in FIG. 25 shows each of the primary lines 14, secondary lines 16 and connecting lines 38 as being substantially perpendicular or parallel to each other (as applicable), the layout of the planting area 18 can generally take on any configuration that may be suitable or desirable for the plants 20 and/or the planting area 18. As such, the direction of these lines 14/16/38 can be non-uniform, such as having different angles or being curved.

The new stake 10 of the present invention generally comprises a stake body 44, a pressure regulator 46 and a conduit connector 48 that, as set forth in more detail below, are cooperatively configured and arranged to connect, at an upper end 50 of the stake 10, to a distribution line 14/16/38 to controllably direct water into or near the root zone 40, which will be generally near the lower end 52 of the stake 10, at or near a plant 20 in a manner which reduces water loss due to evaporation and better deliver water to the roots 32 of the plant 20, as best shown in FIGS. 1-4 and 25-26. In addition, the new stake 10 is structured and arranged in a manner to be easy and relatively quick to install and to be adaptable for use in a wide range of different irrigation systems 12 that may have different sizes and configurations of distribution lines 14/16/38 and different requirements with regard to connecting to the stake 10.

Figure 1:
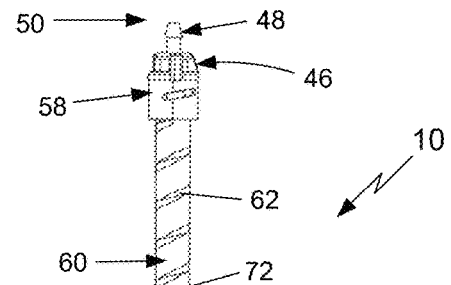
FIG. 1 is a right side view of a subsurface irrigation stake configured according to the present invention having a pressure regulator with an I-shaped conduit connector attached to the stake body.
Figure 2:
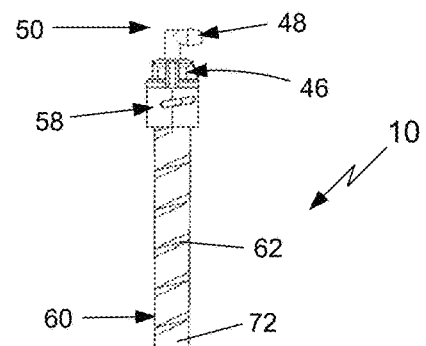
FIG. 2 is a right side view of a subsurface irrigation stake configured according to the present invention having a pressure regulator with a L-shaped conduit connector attached to the stake body.
Figure 3:
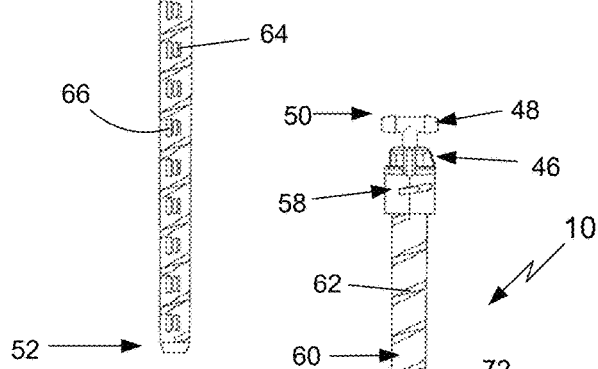
FIG. 3 is a right side view of a subsurface irrigation stake configured according to the present invention having a pressure regulator with a T-shaped conduit connector attached to the stake body.
Figure 4:
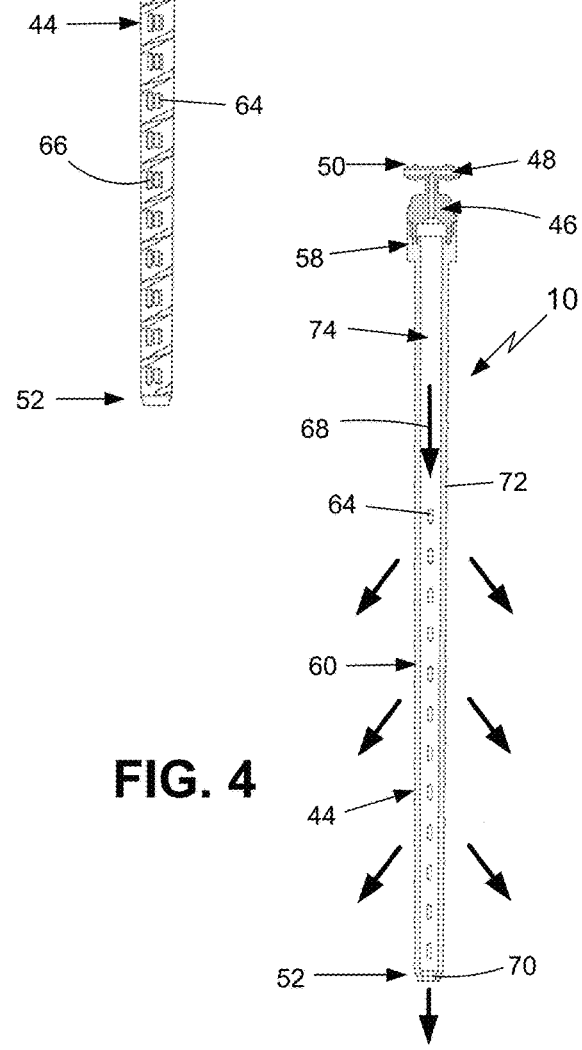
FIG. 4 is a cross-sectional right side view of the subsurface irrigation stake of FIG. 3.
Figure 5:
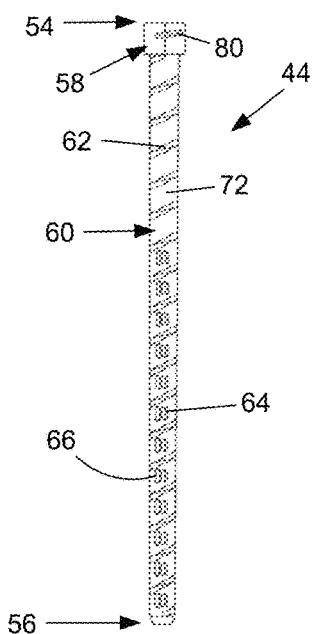
FIG. 5 is a right side view of the stake body of the subsurface irrigation stake of FIG. 1.
Figure 8:
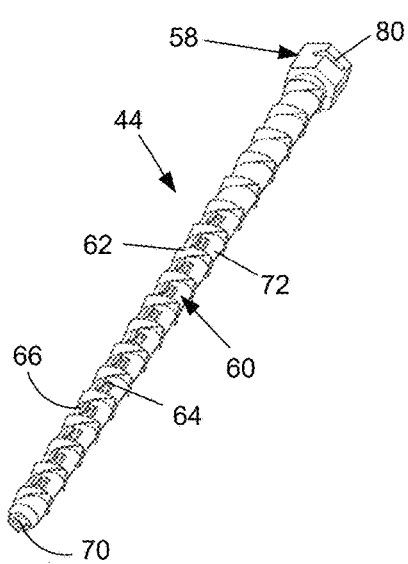
FIG. 8 is a bottom perspective view of the stake body of FIG. 5.

The stake body 44 has an upper end 54 and a lower end 56, with a head 58 at the upper end 54 of the stake body 44 and an elongated tubular shaft 60 that is attached to or integral with the head 58 so as to extend downward therefrom and be in fluid flow communication therewith, as shown in FIGS. 1-13. In a preferred embodiment of the new stake 10, the head 58 is integral with the tubular shaft 60 and the lower end 56 of the stake body 44 defines the lower end 52 of the stake 10. The head 58 of the stake body 44 is structured and arranged to either have formed with or to receive the pressure regulator 46 and support the conduit connector 48, as best shown in FIGS. 1-4, 9 and 13. The elongated tubular-shaped shaft 60 of the stake body 44 has one or more auger flights 62 to assist with placing the new stake 10 in the soil 34 at or near a plant location 28, a plurality of flow apertures 64 that allow water to flow out of the stake 10 into the soil 34 to deliver water to or near the root zone 40 of a plant 20 and a plurality of side blocks 66 that are configured and positioned to reduce the likelihood that soil 34 will move into and clog the flow aperture 64 that is associated with a side block 66 during the process of inserting (using a screw motion) the stake 10 in the soil 34. The stake body 44 is open throughout the head 58 and shaft 60 such that water flowing into the head 58 at the upper end 54 of the stake body 44 (from the conduit connector 48 and pressure regulator 46) will flow, under pressure, downward through the shaft 60 and out the flow apertures 64 into the soil 34 along a flow path 68, as shown FIG. 4. In a preferred embodiment of the new stake 10, the lower end 56 of the stake body 44 is open, having an opening 70 (as best shown in FIGS. 4 and 8), to allow water that does not exit the flow apertures 64 to exit the stake 10 into the soil 34 at the lower end 52 of the stake 10, as generally illustrated by the flow path 68 in FIG. 4.

For purposes of describing the use and relative location of the various components of the present invention, the terms "upper", "upward", "upwardly", "upper" and "top" and the like and the terms "lower", "downward", "downwardly" and "bottom" and the like refer to the direction of or toward, respectively, the relative positions of the conduit connector 48 at the upper end 50 of the stake 10 and to the lower end 52 of the stake 10 (also the lower end 56 of the stake body 44 where the opening 70 is located) with regard to the stake shown FIGS. 1-4. As will be readily appreciated by persons skilled in the art, the above terms reflect the flow of water or other liquid along the flow path 68 from the upper end 50 to the lower end 52 of the stake 10. The stake 10 in FIGS. 1-4 show the right side of the stake 10 facing toward the reader, with the front side of the stake 10 being to the right and the back side of the stake 10 being to the left, as viewed by the reader looking at the stake 10 in FIGS. 1-4. The left side of stake 10 is the side facing away from the reader in FIGS. 1-4. As such, the terms "forward", "forwardly", "front" and the like generally refer to or towards the front side of stake 10 and the terms "rearward", "rearwardly", "back" and the like generally refer to or towards the back side of stake 10. The terms "right" and "left", as well as like terms, refer to or towards the respective sides of the stake 10 described above.

Figure 12:
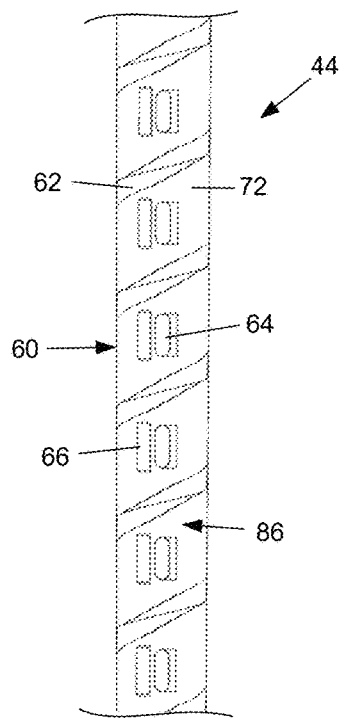
FIG. 12 is an enlarged right side view of a center portion of the stake body of FIG. 5 to better illustrate the opening and side blocks thereof.

The elongated, tubular-shaped shaft 60 has one or more shaft walls 72 that define and enclose an interior area 74 of shaft 60 through which water will flow downward and outward along the flow path 68, as best shown in FIG. 4. In the embodiment shown in the figures, the shaft 60 has a generally circular or round cross-section with a single shaft wall 72. However, as will be readily appreciated, the shaft 60 can have a plurality of shaft walls 72 that define a square, rectangular, pentagon, hexagon or other shape. The plurality of flow apertures 64, which define a water zone 75 of the stake 10, are cut out of or otherwise removed from the shaft wall 72 so as to be in fluid flow connection with the interior area 74 of shaft 60 so water will flow outward from the interior area 74 through the flow apertures 64, as best shown in FIG. 4, to the soil 34. Each of the side blocks 66 are attached to or, preferably, integral with the shaft wall 72 to extend outward from the shaft wall 72 in an location generally near or adjacent to a flow aperture 64, as best shown in FIG. 12. In a preferred configuration of the stake body 44, a single side block 66 is located generally adjacent each one of the flow apertures 64. The side blocks 66 are sized and configured to reduce the likelihood that soil 34, or other material, will partially or completely fill the associated flow aperture 64 such that the soil/material will clog or otherwise limit the outflow of water through the flow aperture 64. As such, each side block 64 is located "downstream" of the associated flow aperture 64 as the stake body 44 is screwed into the soil 34, as described below.

Figure 6:
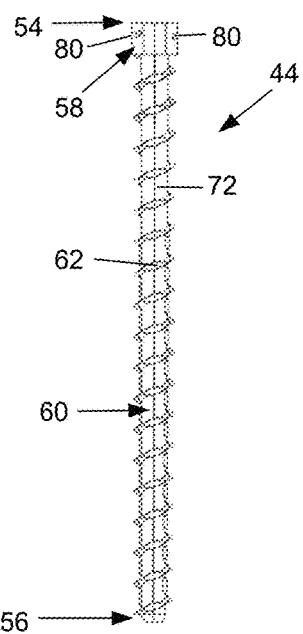
FIG. 6 is a front view of the stake body of FIG. 5.
Figure 7:
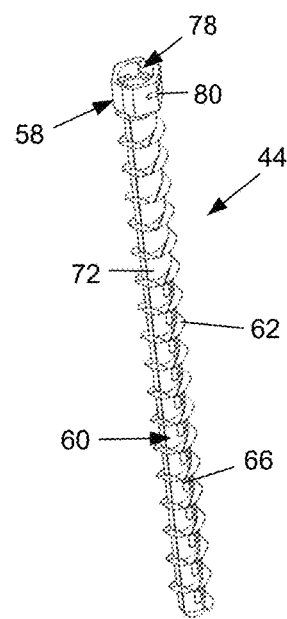
FIG. 7 is a top perspective view of the stake body of FIG. 5.
Figure 9:
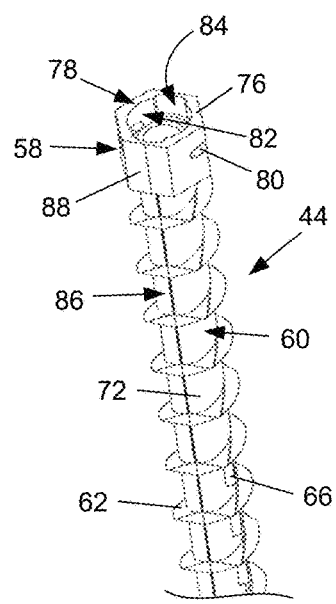
FIG. 9 is an enlarged top perspective view of the upper portion of the stake body of FIG. 7 to better illustrate the upper section and the auger flights on the lower section thereof.
Figure 11:
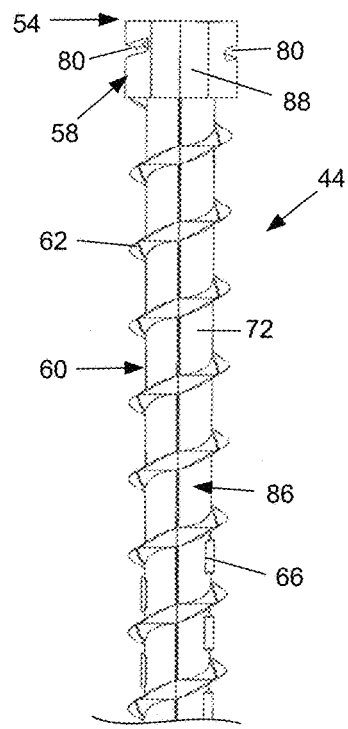
FIG. 11 is an enlarged front view of the upper portion of the stake body of FIG. 6 to better illustrate the auger flights on the lower section and the upper section thereof.
Figure 13:
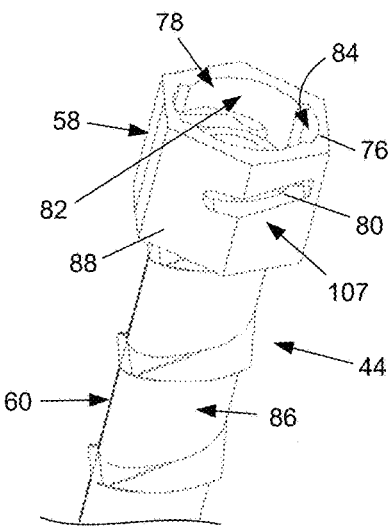
FIG. 13 is an enlarged right side perspective view of the stake body of FIG. 5 to better illustrate the upper section thereof.
Figure 14:
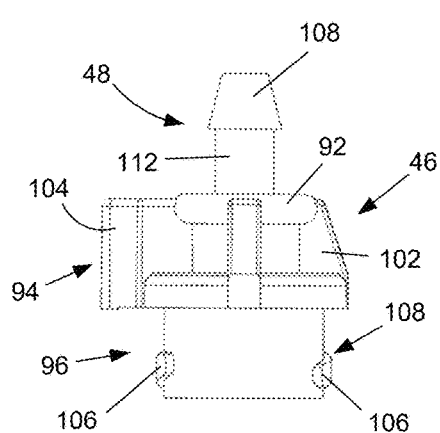
FIG. 14 is a front view of the pressure regulator and conduit connector of the subsurface irrigation stake of FIG. 1.
Figure 15:
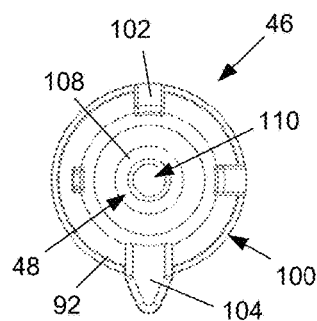
FIG. 15 is a top view of the pressure regulator and conduit connector of FIG. 14.
Figure 16:
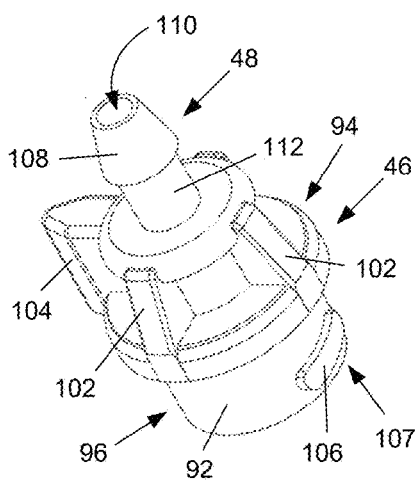
FIG. 16 is a top perspective view of the pressure regulator and conduit connector of FIG. 15.
Figure 17:
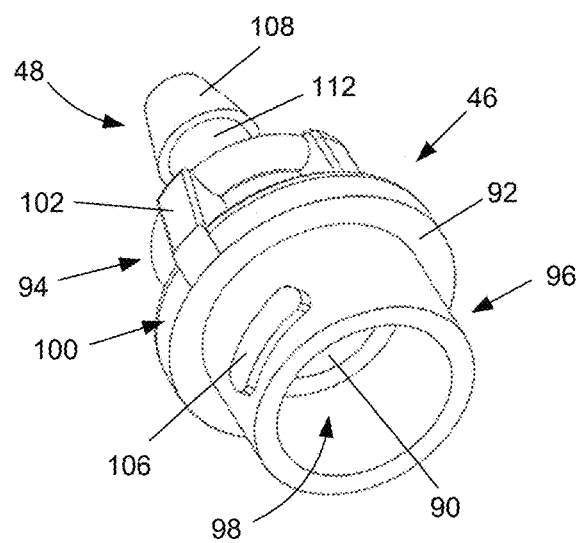
FIG. 17 is a bottom perspective view of the pressure regulator and conduit connector of FIG. 16.
Figure 18:
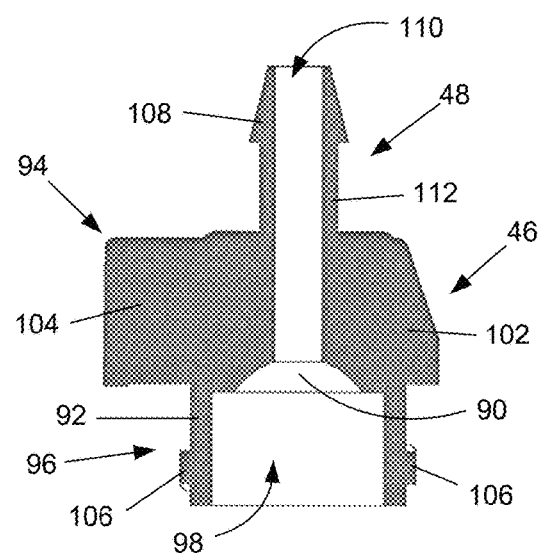
FIG. 18 is a cross-sectional front view of the pressure regulator and conduit connector of FIG. 14.
Figure 19:
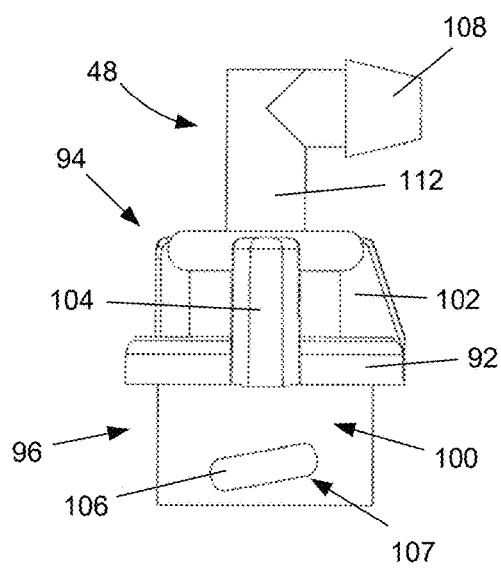
FIG. 19 is a right side view of the pressure regulator and conduit connector of the subsurface irrigation stake of FIG. 2.
Figure 20:
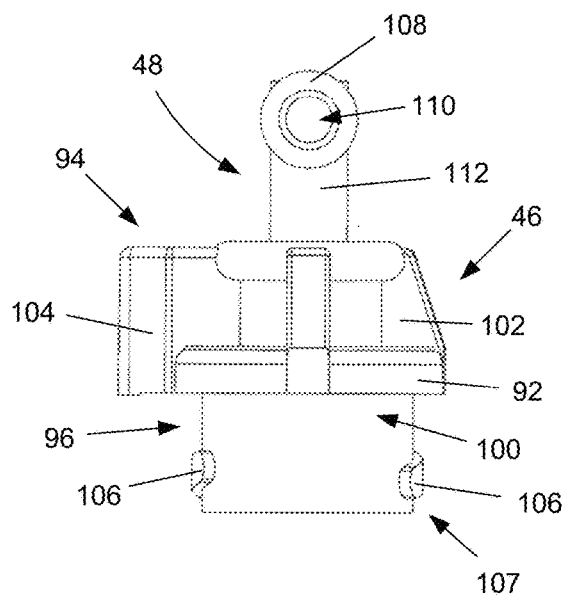
FIG. 20 is a front view of the pressure regulator and conduit connector of FIG. 19.
Figure 21:
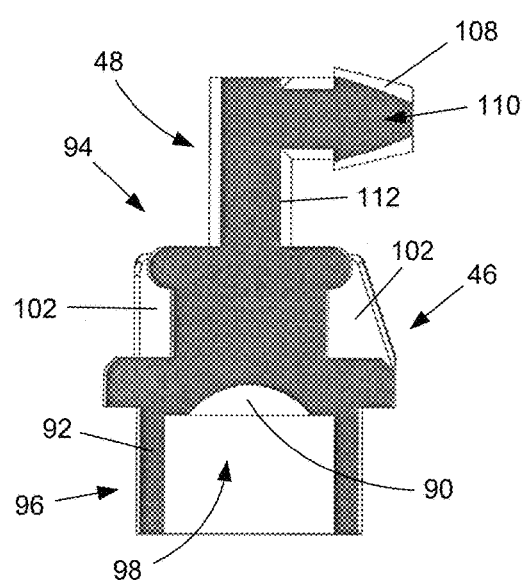
FIG. 21 is a cross-sectional right side view of the pressure regulator and conduit connector of FIG. 19.
Figure 22:
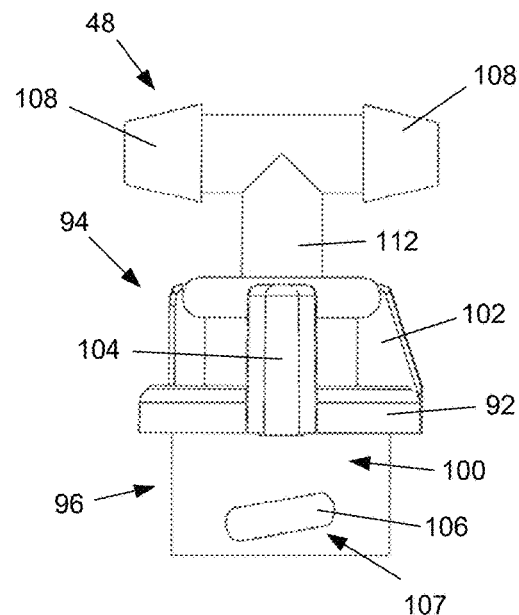
FIG. 22 is a right side view of the pressure regulator and conduit connector of the subsurface irrigation stake of FIG. 3.
Figure 23:
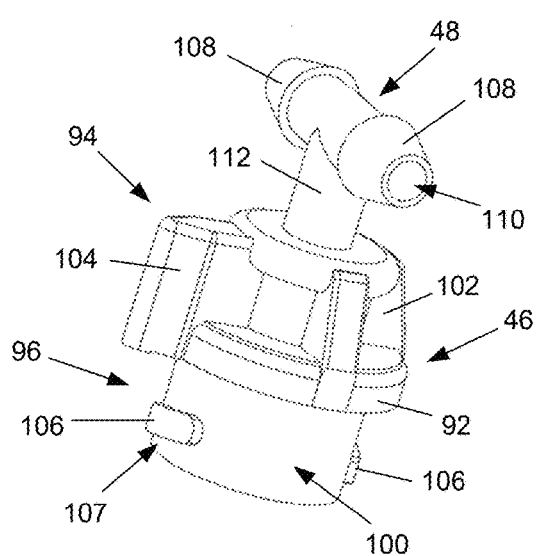
FIG. 23 is a front perspective view of the pressure regulator and conduit connector of FIG. 22.
Figure 24:
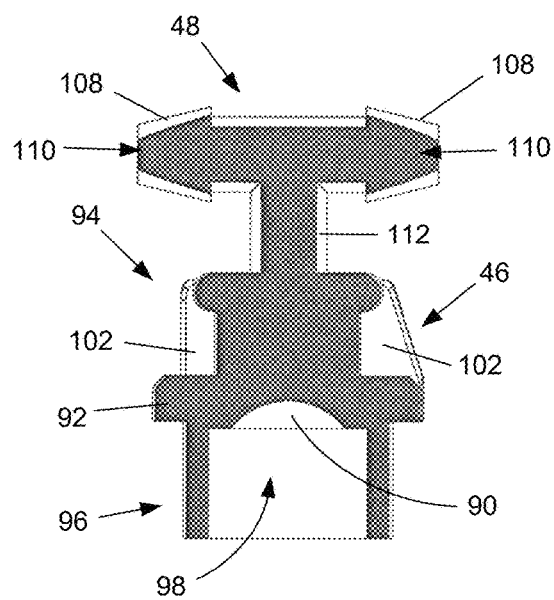
FIG. 24 is a cross-sectional right side view of the pressure regulator and conduit connector of FIG. 22.

As set forth in more detail below with regard to the discussion about the pressure regulator, the head 58 of the stake body 44 has a head wall 76 that defines a receiving area 78, best shown in FIGS. 9 and 13, that is open at the upper end 54 of the stake body 44 and in fluid flow communication with the interior area 74 of the shaft 60. In a preferred embodiment, the receiving area 78 of head 58 is sized and configured to securely and engagedly receive the pressure regulator 46 and to allow water to flow downward to the shaft 60 and out to the soil 34. In the figures included herewith, the head 58 of the stake body 44 has one or more slots 80 in the head wall 76 (two are shown on opposites of the head 58, as best shown in FIGS. 6,11 and 13). As described in more detail below, the one or more slots 80 in the head wall 76 of head 58 are positioned, sized and configured to receive cooperatively sized and configured components on the pressure regulator 46 to allow the user to engagedly attach the pressure regulator 46 to the head 58 so as to removably secure the pressure regulator 46 to the stake body 44, as shown in FIGS. 1-4. In addition to the slots 80 in the head wall 76 of head 58, the interior surface 82 of head wall 76 of head 58 is configured with one or more cut-out areas 84, best shown in FIGS. 9 and 13, that are sized and configured in cooperative arrangement with the pressure regulator 46 to help align and guide the pressure regulator 46 generally into the receiving area 78 and the relevant areas of the pressure regulator 46 into the slots 80 in order to securely engage the pressure regulator 46 with the stake body 44. Because the pressure regulator 46 (with the conduit connector 48) is removably secured to the stake body 44, the user will be able to easily replace or swap out, as may be desired or necessary, the pressure regulator 46, such as for a different size or type of pressure regulator 46 or to replace a damaged pressure regulator 46, and the conduit connector 48 that is attached or integral with the pressure regulator 46 to replace a damaged conduit connector 48 or to provide a different type of connection (e.g., vertical, elbow, tee or cross shapes) to a distribution line 14/16/38 to which the stake 10 is connected (e.g., connecting line 38 in the figures) to direct water to the stake 10 and, as a result, the soil 34. In other embodiments, the pressure regulator 46 can be integral with the head 58 of the stake body 44, with the conduit connector 48 being a separate, easily removably connected component that can be replaced by the user as desired or necessary. In yet other embodiments, both the pressure regulator 46 and the conduit connector 48 can be integral with the head 58 of the stake body 44, such that the stake 10 is a single integral component.

Figure 10:
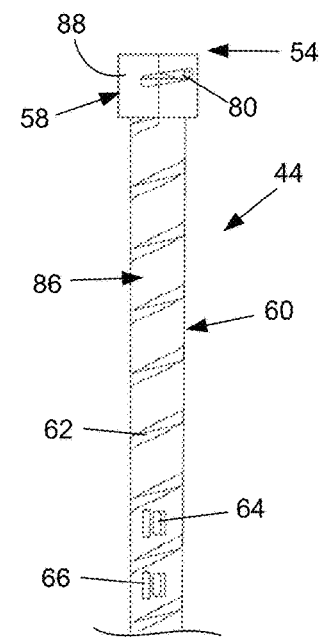
FIG. 10 is an enlarged right side view of the upper portion of the stake body of FIG. 5 to better illustrate the components thereof.

As set forth above, the shaft 60 of the stake body 44 has one or more auger flights 62 thereon that are sized and configured to facilitate easy insertion of the shaft 60 into the soil 34 at a plant location 28 where one or more plants 20 is or will be located, as shown in FIGS. 1-13. The use of auger flights 62 on a vertical shaft or like component is generally well known in the general art of creating a hole on the surface or through a material, including holes in the ground for an access opening or shaft, to install a subsurface pipe or form a hole for planting a plant 20. In the embodiment of the stake 10 in the figures, the auger flights 62 are a single continuous shaped outward feature on the outer surface 86 of the shaft wall 72, as best shown in FIGS. 9-13. To assist the user with inserting the shaft 60 into the soil 34, the head 58 of the stake body 44 has a plurality of flats 88, as best shown in FIGS. 10-11 and 13, that are sized and configured to allow the user to engage the head 58 of a stake 10 with a socket which is operatively attached to a driver, such as a powered drill or the like, so the powered rotation of the driver will rotate the socket and, due to the engagement with the flats 88, rotate the head 58 and cause the auger flights 62 to move downward into the soil 34 at the location where the user wants to deliver water, via the stake 10, to the current or future location of a root zone 40 of a plant 20 to more effectively and efficiently get the water to the root system 30 of the plant 20. In the embodiment shown in the figures, the head 58 of the stake body 44 is hexagon shaped and, as a result, has six flats 88 around the outer perimeter of the head wall 76. In general, the use of auger flight 62 on an elongated body of an object and flats 88 on the "head" portion of the object to facilitate rotational movement of the object into a surface is well known to persons who are skilled in the relevant arts. As will be readily understood and appreciated by persons who are skilled in the art of installing and using an irrigation system having distribution lines 14/16/38, the auger flights 62 and flats 88 of the stake 10 will significantly ease installation of the stake 10 and, therefore, reduce the time and costs associated therewith.

As set forth above, the new stake 10 has a pressure regulator 46 that is attached to or integral with the stake body 44 and a conduit connector 48 that is attached to or integral with the pressure regulator 46 with both components being in fluid flow communication with each other and with the interior area 74 of the shaft 60. In a preferred configuration of the stake 10, the pressure regulator 46 is removably received in the receiving area 78 of the head 58 and securely attached to the head wall 76, via slots 80, of the head 58 of the stake body 44, as best shown in FIGS. 1-4. The pressure regulator 46 of the new stake 10 is utilized to compensate for pressure differential across the irrigation system 12 in order to help maintain a uniform flow rate at each of the plant locations 28, regardless of where the stakes 10 are located in the system 12, topography and other issues that would otherwise effect the uniform delivery of water to each plant 20 or plant location 28. The use of pressure regulators in the field of irrigation, specially in-line pressure compensating regulators for drip irrigation, is well known by persons skilled in the relevant art. A pressure regulator is configured to deliver a particular flow rate at different inlet water pressure. There are a wide variety of different types of pressure regulators, including those that use a diaphragm, spring pressure, a labyrinth and other mechanisms to control the flow rate past under different operating pressures.

The pressure regulator 46 shown in the drawings is the type which uses a diaphragm 90, best shown in FIGS. 17-18, 21 and 24, positioned inside the regulator body 92 to control the flow rate into the stake body 44 under different inlet pressures. As shown in FIGS. 14-24, the regulator body 92 has an upper section 94 and a lower section 96 that define an interior area 98 which is structured and arranged to support the diaphragm 90 and allow water to pass through from the conduit connector 46 to the stake body 44 and onto the soil 34. The lower section 96 is sized and configured to be received in the receiving area 78 and to engage the head wall 76 of the head 58 of the stake body 44 to engage the pressure regulator 46 with the stake body 44. The upper section 98, in addition to enclosing the diaphragm 90 in the interior area 98, has one or more beneficial features on the outer surface 100 of the regulator body 92 that are configured to allow the user to relatively easily and quickly insert and engage the pressure regulator 46 with the head 58 of the stake body 44 to securely join these two components together, as shown in FIGS. 1-4. In one embodiment, the outer surface 100 has one or more, preferably a plurality of, outwardly extending support members 102 and at least one outwardly projecting force member 104, as shown in FIGS. 14-24, that allows the user to more easily hold onto and grasp the outer surface 100 of the pressure regulator 46 when inserting the lower section 96 into the head 58 of the stake body 44 and apply a twisting force to engage the pressure regulator 46 with the stake body 44. In the preferred embodiments, the pressure regulator 46 is removably engaged with the stake body 44 so that the user may easily replace the pressure regulator 46 and, in the preferred embodiments, the integral conduit connector 48. As will be readily appreciated by persons skilled in the relevant art, the user will place his or her finger and/or thumb against the support member 102 and the force member 104 to apply a twisting or like motion with his or her hand to the pressure regulator 46 to securely engage (as set forth below) the pressure regulator 46 with the stake body 44.

As set forth above, the lower section 96 of the regulator body 92 of the pressure regulator 46 is structured and arranged to fit within the receiving area 78 of the head 58 and removably engage the head 58 of the stake body 44 to form a complete stake 10 (when the conduit connector 48 is integral with the pressure regulator 46 or connected thereto). In the embodiment shown in the figures, the regulator body 92 of the lower section 96 sized and configured in corresponding relation with the shape and size of the receiving area 78 of the head 58 so as to be received therein in abutting relation, or nearly abutting, with the interior surface 82 of the head 58. In the figures, both the receiving area 78 and the regulator body 92 of the lower section 96 are circular. However, other shapes can be utilized as long as the regulator body 92 of the lower section 96 fits into and, in the preferred configuration, rotate relative to the interior surface 82 of the head 58.

To securely engage the pressure regulator 46 with the head 58 of the stake body 44, the pressure regulator 46 has at least one outwardly extending engaging member 106 (two are shown in the figures) that extends outward from the outer surface 100 of the regulator body 92 at the lower section 96 thereof, as best shown in FIGS. 14, 16-20 and 22-23. Each of outwardly extending engaging members 106 are sized and configured to be engagedly received in the slots 88 in the head wall 76 of the head 58 to lockedly engage the pressure regulator 46 with the head 58 of the stake body 44. The outwardly extending engaging members 106 are also cooperatively sized and configured with the cut-out areas 84 in the head wall 76 of the head 58 to allow the lower section 96 of the pressure regulator 46 to be easily inserted into the receiving area 78 of the head 58. With the cut-out areas 84, slots 80 and engaging members 106 cooperatively sized and configured, the user will position the lower section 96 of the pressure regulator 46 over the receiving area 78 with the engaging members 106 aligned over the cut-out areas 84 of the head body 92, push the pressure regulator 46 downward to insert the lower section 96 fully into the receiving area 78 and then, with his or her fingers and/or thumb against the support members 102 and force member 104, twist the pressure regulator 46 to move the engaging members 106 to the slots 80 to engage the engaging members 106 inside the slots 80 to securely connect the pressure regulator 46 with the head 58 of the stake body 44, as shown completed in FIGS. 1-4. As also shown in these figures, the upper section 94 and the conduit connector will be positioned above the head 58 for ease of access to the upper section 94 of the pressure regulator 46 for easy and quick removal of the pressure regulator 46 and for ease of connecting the stake 10 with the relevant distribution line 14/16/38, as shown in FIGS. 25-26 with regard to a connecting line 38.

As will be readily appreciated by persons who are skilled in the art, a variety of other connecting mechanisms 107 other than the twist operation of the slot 80 and engaging member 106 shown in the figures can be utilized with the stake 10 of the present invention to removably, but securely, engage the pressure regulator 46 with the stake body 44, although it is believed that such configuration will provide an easy, cost effective and secure connection. For instance, the lower section 96 of the regulator body 92 can be externally threaded to be received in an internally threaded receiving area 78 (or reverse configuration) to securely attach the pressure regulator 46 to the stake body 44. In other alternative configurations, screws, bolts and/or other connectors can be utilized to connect the pressure regulator 46 to the head 58 of the stake body 44. If desired, a clamp or other type of clamping mechanism can be utilized to clamp the pressure regulator 46 to the head 58 of the stake body 44. These and other equivalent mechanisms and/or devices are generally well known in the art to removably secure two tubular shaped components together. In another alternative configuration, an adhesive (such as those commonly used to attach to pipe sections and/or pipe connectors together) can be used on the outer surface 100 of the lower section 96 of the pressure regulator 46 and/or on the interior surface 82 of the receiving area 78 of the head 58 to secure (not easily removed) the pressure regulator 46 to the head 58 of the stake body 44. In yet another embodiment, as set forth above, the pressure regulator 46 can be integrally formed with the head 58 of the stake body 44, with or without the conduit connector 48 being integral with the pressure regulator 46.

The conduit connector 48 is utilized to connect the new stake 10 to a water distribution line 14/16/38 of an irrigation system 12 to place the stake 10 in fluid flow connection with the source of water 22 so water will flow from the source of water 22 through the distribution lines 14/16/38 to the stake 10, into the pressure regulator 46 via the conduit connector 48 and then down the stake body 44 so that water can be directed to the soil 34 at or near the root zone 40 of a plant 20, or where a plant 20 may be located, through the flow apertures 64 and opening 70 in the shaft 60 of the stake body 44. In this manner, the user will be able to better direct water to the root system 30 of a plant 20 and reduce the loss of water that would otherwise occur due to evaporation. A variety of different types and sizes of distribution lines 14/16/38 and layouts of such lines 14/16/38 in a planting area 18 are commonly utilized in irrigation systems 12, including drip irrigation systems, all of which require different sizes and types of conduit connectors 48 to connect the new stake 10 thereto. As will be readily appreciated, the layout of such distribution lines 14/16/18 require the use of differently configured line connectors, such as those having an I-shape, L-shape, T-shape, X-shape and the like.

The new stake 10 can be configured to accommodate the size and shape requirements of all such connectors. For instance, in the drawings, FIGS. 1 and 14-18 show use of an I-shaped connector 48a, FIGS. 2, 19-21 and 26 show use of an L-shaped connector 48b and FIGS. 3-4 and 22-24 show use of a T-shaped connector 48c. Any of the conduit connectors 48 are sized and configured to engage, typically by being inserted into, an opening in a distribution line 14/16/38 so that water will flow from the line 14/16/38 to the conduit connector 48 and then into the pressure regulator and down the stake body 44 to the soil 34, as shown in FIG. 4 with regard to the T-shaped connector 48c. As such, each of the conduit connectors 48 have an engaging section 108 that engages a distribution line 14/16/18 and at least one conduit opening 110 through which pressurized water flows into the stake 10. The T-shaped connector 48c has two conduit openings 110 such that a portion of the water will flow into a stake 10 and water will flow past the a particular stake 10 to either the next stake 10 in the line 14/16/38 or to other irrigation components.

Figure 27:
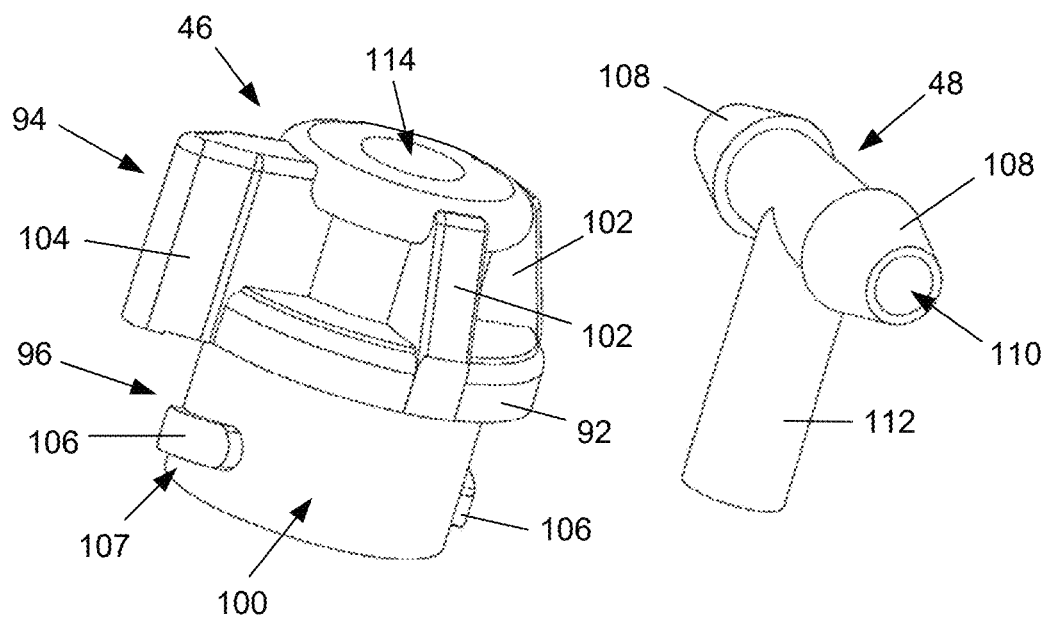
FIG. 27 is a front perspective view of an alternative configuration for the pressure regulator and conduit connector of the subsurface irrigation stake of FIG. 1 showing the pressure regulator and conduit connector as separate components.

In the embodiment shown in the figures, the conduit connector 48 is integrally formed with the pressure regulator 46 such that these components are a single piece that is removably received into and connects to the receiving area 78 of the head 58 of the stake body 44, as generally shown in FIGS. 1-4. In an alternative configuration, the pressure regulator 46 and conduit connector 48 can be cooperatively configured for the conduit connector 48 to be removably attached to the pressure regulator 46, whether the pressure regulator 46 is connected to or integral with the stake body 44 of the stake, to allow the user to easily and quickly swap out just the conduit connect 48 if it becomes damaged or if he or she desires to formulate a different connection to a distribution line 14/16/38 that requires a different size or shape of the engaging section 108 of the conduit connector 48. This can be accomplished, in one manner, by having the downward section 112, best shown in FIGS. 14 and 16-24, of the conduit connector 48 being removably received in an opening 114 in the top area of the regulator body 92 of the pressure regulator 46, as shown in the embodiment of FIG. 27. In any such configuration, the pressure regulator 46 and conduit connector 48 must be cooperatively configured for the conduit connector 48 to securely engage the pressure regulator 46, such as the downward section 112 of conduit connector 48 being cooperatively sized and configured to tightly fit into the opening 114 of the pressure regulator 46. As will be readily appreciated by persons who are skilled in the art, a variety of other configurations and or devices can be utilized to removably, but securely, connect a downward section 112 of a conduit connector 48 to an opening 114, or other component, of a pressure regulator 46 to direct water from a distribution line 14/16/38 into a stake 10 through the opening 110 of the conduit connector 48.

The new stake 10 of the present invention can be made in a wide variety of different sizes and shapes, suitable for a wide variety of different types of connections to distribution lines 14/16/38 and a wide variety of flow rates, and can be manufactured out of a wide variety of different materials. In one embodiment, the new stake 10 can have an overall length of eight to thirty inches, for insertion into the soil of seven to twenty-nine inches, and sized for connection to one-fourth inch drip line tubing, as the distribution line 14/16/38. In a possible preferred configuration, the stake body 44 may be nine to ten inches, with an overall length of ten to eleven inches. The material for the new stake 10 can be a wide variety of plastics, including polypropylene or high density polyethylene for stake body 44, polypropylene or Acetal for the integrally formed pressure regulator 46 and conduit connector 48 and a flexible PVC or Santoprene TPR for the diaphragm 90. If desired, however, the new stake 10 can be made from virtually any type of material, including a variety of combined or composite materials. Instead of using flats 88 and having the head 58 being configured for engagement by a socket or the like, the stake 10 can be configured for other devices, including screwdrivers and the like, to be utilized to screw the stake 10 into the soil 34.

In use, the new stake 10 is attached to an open end of a distribution line 14/16/38. Because the new stake 10 has a pressure regulator 46, the new stake 10 eliminates the need for an additional fitting to connect to a distribution line 14/16/38. In addition, because the water for the plant location 28 where a plant 20 is or will be located is directed to the soil 34 under the ground surface 36, the water will more likely get to and benefit the root system 30 in the root zone 40 of a plant 20, which is likely to benefit the plant 20 and improve the production of the desired crop 24. In addition, because the water is distributed to the soil 34 below the ground surface 36, instead of on top of the ground surface 36, the new stake 10 will reduce the loss of water due to evaporation, thereby saving water for the user. Over a large planting area 18 and over many planting areas 18, the stake 10 will be able to save a significant amount of water. Because the new stake 10 has a type of "modular" configuration, the user will able to customize a stake 10 to the various requirements of his or her irrigation system 12 and planting area 18. The auger flights 62 on the shaft 60 and the flats 88 on the head 58 of the stake body 44 will allow the user to easily and quickly install a stake 10 into the soil 34 at or near a planting location 28, thereby significantly reducing the time and cost to install stakes 10 throughout a planting area 18 and, if it becomes necessary or desired, to remove the stakes 10.

While there are shown and described herein various specific forms of the present invention, it will be readily apparent to those persons who are skilled in the relevant art that the invention is not so limited, but is susceptible to various modifications and rearrangements in design and materials without departing from the spirit and scope of the invention. In particular, it should be noted that the present invention is subject to modification with regard to any dimensional relationships that may be set forth herein and to modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention without any undue experimentation. Although, the described embodiments may comprise one or more different features, not all of these features are required in all embodiments of the present invention. More specifically, as will be readily appreciated by persons who are skilled in the relevant art, certain embodiments of the present invention only utilize some of the features and/or combinations of features disclosed herein.

What is claimed is:

1. A subsurface irrigation stake for watering a plant location with water from a source of water so as to water a plant having a root system defining a root zone in a soil below a ground surface at the plant location, said subsurface irrigation stake comprising:

a stake body having an open upper end, a lower end, a head at said upper end of said stake body and an elongated tubular shaft extending downward from said head to said lower end of said stake body, said shaft having a shaft wall defining an interior area of said shaft, said head having a head wall with an interior surface defining a receiving area in fluid flow communication with said interior area of said shaft to define a flow path in said stake body, said shaft sized and configured to be positioned in the soil below the ground surface generally at or near the root zone of the plant with said head of said stake body being positioned at or above the ground surface;

a slot in said interior surface of said head wall;

one or more flow apertures in said shaft wall, said one or more flow apertures in fluid flow communication with said interior area to direct water from said interior area of said shaft to the soil at or near the root zone of the plant;

a pressure regulator cooperatively configured with said receiving area so as to removably connect to said head of said stake body in fluid flow communication with said interior area of said shaft of said stake body, said pressure regulator structured and arranged to control the flow of water into said shaft and the soil;

an engaging member on an outer surface of said pressure regulator, said engaging member cooperatively sized and configured with said slot for said engaging member to engage said slot when said pressure regulator is in said receiving area to connect said pressure regulator to said head of said stake body;

a conduit connector attached to or integral with said pressure regulator and in fluid flow communication with said pressure regulator and said interior area of said shaft to connect the source of water to said subsurface irrigation stake, wherein when subsurface irrigation stake is positioned with said shaft in the soil and said conduit connector is connected to the source of water for water to flow through said flow path, said subsurface stake will discharge water from the source of water into the soil below the ground surface so as to better direct water to the root zone of the plant when the plant is at or near the plant location and to reduce loss of water due to evaporation.

2. The subsurface irrigation stake of claim 1, wherein said shaft has a plurality of flow apertures in a water zone of said subsurface irrigation stake, each of said plurality of flow apertures connected to said interior area of said shaft so as to discharge water into the soil when said conduit connector is connected to the source of water.

3. The subsurface irrigation stake of claim 2, wherein said shaft has an opening at said lower end of said stake body in fluid flow communication with said interior area of said shaft so as to discharge water from the source of water into the soil through said opening.

4. The subsurface irrigation stake of claim 2, wherein said shaft has a plurality of side blocks attached to or integral with an outer surface of said shaft wall so as to extend outwardly therefrom, each one of said plurality of side blocks being associated with one of said plurality of flow apertures and positioned at said one of said plurality of flow apertures so as to reduce the likelihood that said one of said plurality of said flow apertures will be clogged by the soil when said shaft of said subsurface irrigation stake is rotated into the soil.

5. The subsurface irrigation stake of claim 1 further comprising one or more auger flights on an outer surface of said shaft wall so as to extend outwardly from said shaft wall, said one or more auger flights structured and arranged to allow said shaft of said subsurface irrigation stake to be screwed into the soil below the ground surface.

6. The subsurface irrigation stake of claim 5, wherein said one or more auger flights extend from at or near said head to said lower end of said subsurface irrigation stake.

7. The subsurface irrigation stake of claim 1, wherein said head wall of said head of said stake body has one or more cut-out areas in cooperative arrangement with said engaging member so as to receive said engaging member in said receiving area of said head prior to engagement of said engaging member with said slot in said head wall.

8. The subsurface irrigation stake of claim 1, wherein said conduit connector removably connects to said pressure regulator and comprises one or more engaging sections and a downward section, each of said one or more engaging sections are structured and arranged to connect to a distribution line that is in fluid flow communication with the source of water, said downward section cooperatively sized and configured with an opening in said pressure regulator so as to be removably received in and securely engaged with said opening in said pressure regulator so as to connect the distribution line to said interior area of said stake body.

9. A subsurface irrigation stake for watering a plant location with water from a source of water so as to water a plant having a root system defining a root zone in a soil below a ground surface at the plant location, said subsurface irrigation stake comprising:

a stake body having an open upper end, a lower end, a head at said upper end of said stake body and an elongated tubular shaft extending downward from said head to said lower end, said head having a head wall defining a receiving area in said head, said shaft having a shaft wall defining an interior area of said shaft, said receiving area of said head in fluid flow communication with said interior area of said shaft to define a flow path through said stake body, said shaft sized and configured to be positioned in the soil below the ground surface generally at or near the root zone of the plant with said head of said stake body being positioned at or above the ground surface;

a slot in an interior surface of said head wall;

a plurality of flow apertures in said shaft wall, each of said plurality of flow apertures in fluid flow communication with said interior area to discharge water from said interior area of said shaft to the soil at or near the root zone of the plant when said stake body is in the soil and said subsurface irrigation stake is connected to the source of water;

one or more auger flights on an outer surface of said shaft wall so as to extend outwardly from said shaft wall, said one or more auger flights structured and arranged to allow said shaft of said subsurface irrigation stake to be screwed into the soil below the ground surface;

a pressure regulator removably received in said receiving area of said head so as to be in fluid flow communication with said interior area of said shaft, said pressure regulator structured and arranged to control the flow of water into said shaft and the soil;

an engaging member on an outer surface of said pressure regulator, said engaging member cooperatively sized and configured with said slot for said engaging member to be received in said slot when said pressure regulator is in said receiving area to removably join said pressure regulator to said head of said stake body; and a conduit connector attached to or integral with said pressure regulator and in fluid flow communication with said pressure regulator and said interior area of said shaft, said conduit connector having at least one engaging section that is sized and configured to connect said conduit connector to a distribution line in fluid flow communication with the source of water so as to connect the source of water to said subsurface irrigation stake, wherein when subsurface irrigation stake is positioned with said shaft in the soil and said conduit connector is connected to the source of water for water to flow through said flow path, said subsurface stake will discharge water from the source of water into the soil below the ground surface so as to better direct water to the root zone of the plant when the plant is at or near the plant location and to reduce loss of water due to evaporation.

10. The subsurface irrigation stake of claim 9, wherein said shaft has a plurality of side blocks attached to or integral with an outer surface of said shaft wall so as to extend outwardly therefrom, each one of said plurality of side blocks being associated with one of said plurality of flow apertures and positioned at said one of said plurality of flow apertures so as to reduce the likelihood that said one of said plurality of said flow apertures will be clogged by the soil when said shaft of said subsurface irrigation stake is screwed into the soil.

11. A subsurface irrigation stake for watering a plant location with water from a source of water so as to water a plant having a root system defining a root zone in a soil below a ground surface at the plant location, said subsurface irrigation stake comprising:
a stake body having an open upper end, a lower end, a head at said upper end of said stake body and an elongated tubular shaft extending downward from said head to said lower end, said head having a head wall defining a receiving area in said head, said shaft having a shaft wall defining an interior area of said shaft, said receiving area of said head in fluid flow communication with said interior area of said shaft to define a flow path through said stake body, said shaft sized and configured to be positioned in the soil below the ground surface generally at or near the root zone of the plant with said head of said stake body being positioned at or above the ground surface;
a plurality of flow apertures in said shaft wall, each of said plurality of flow apertures sized and configured to discharge water from said interior area of said shaft to the soil at or near the root zone of the plant when said stake body is in the soil and said subsurface irrigation stake is connected to the source of water;
one or more auger flights on an outer surface of said shaft wall so as to extend outwardly from said shaft wall, said one or more auger flights structured and arranged to allow said shaft of said subsurface irrigation stake to be screwed into the soil below the ground surface;
a pressure regulator having an engaging member on an outer surface thereof, said engaging member cooperatively sized and configured with a slot in an interior surface of said head wall for said engaging member to be received in said slot when said pressure regulator is received said receiving area to removably join said pressure regulator to said head of said stake body, said pressure regulator in fluid flow communication with said interior area of said shaft when said pressure regulator is in said receiving area, said pressure regulator structured and arranged to control the flow of water into said shaft and the soil; and
a conduit connector attached to or integral with said pressure regulator and in fluid flow communication with said pressure regulator and said interior area of said shaft, said conduit connector having at least one engaging section that is sized and configured to connect said conduit connector to a distribution line in fluid flow communication with the source of water so as to connect the source of water to said subsurface irrigation stake,
wherein when subsurface irrigation stake is positioned with said shaft in the soil and said conduit connector is connected to the source of water for water to flow through said flow path, said subsurface stake will discharge water from the source of water into the soil below the ground surface so as to better direct water to the root zone of the plant when the plant is at or near the plant location and to reduce loss of water due to evaporation.

12. The subsurface irrigation stake of claim 11, wherein said shaft has an opening at said lower end of said stake body in fluid flow communication with said interior area of said shaft so as to discharge water from the source of water into the soil through said opening.

13. The subsurface irrigation stake of claim 11, wherein said shaft has a plurality of side blocks attached to or integral with an outer surface of said shaft wall so as to extend outwardly therefrom, each one of said plurality of side blocks being associated with one of said plurality of flow apertures and positioned at said one of said plurality of flow apertures so as to reduce the likelihood that said one of said plurality of said flow apertures will be clogged by the soil when said shaft of said subsurface irrigation stake is screwed into the soil.

14. The subsurface irrigation stake of claim 11, wherein said one or more auger flights extend from at or near said head to said lower end of said subsurface irrigation stake.

15. A subsurface stake for distributing fluid from a source of fluid into a medium located below a surface, said subsurface stake comprising:
a stake body having an open upper end, a lower end, a head at said upper end of said stake body and an elongated tubular shaft extending downward from said head to said lower end of said stake body, said shaft having a shaft wall defining an interior area of said shaft, said head having a head wall with an interior surface defining a receiving area that is in fluid flow communication with said interior area of said shaft to define a flow path in said stake body;
one or more flow apertures in said shaft wall, each of said one or more flow apertures in fluid flow communication with said interior area to direct fluid from said interior area of said shaft to the medium below the surface when said shaft is positioned in the medium and connected to the source of fluid; and
a slot in said head of said subsurface stake, said slot structured and arranged to be removably engaged by an engaging member extending outward from an outer surface of a pressure regulator when the pressure regulator is positioned in said receiving area so as to securely connect the pressure regulator to said subsurface stake in fluid flow communication with said interior area of said shaft, the pressure regulator having a conduit connector that is integral therewith or attached thereto to place the pressure regulator in fluid flow communication with the source of fluid and direct fluid from the source of fluid into the subsurface stake, the pressure regulator being structured and arranged to control the flow of fluid into the medium through said one or more flow apertures when the conduit connector is connected to the source of fluid.

16. The subsurface stake of claim 15 further comprising one or more auger flights on an outer surface of said shaft wall so as to extend outwardly from said shaft wall, said one or more auger flights structured and arranged to allow said shaft of said subsurface stake to be screwed into the medium below the surface.

17. The subsurface stake of claim 16, wherein said shaft has a plurality of side blocks attached to or integral with said outer surface of said shaft wall so as to extend outwardly therefrom, each one of said plurality of side blocks being directly associated with one of said one or more flow apertures and positioned adjacent to said one of said one or more flow apertures so as to reduce the likelihood that said one of said one or more flow apertures will be clogged by the medium when said shaft of said subsurface stake is rotated into the medium.

18. The subsurface stake of claim 15, wherein said shaft has an opening at said lower end of said stake body in fluid flow communication with said interior area of said shaft so as to discharge water from the source of water into the soil through the opening.

19. The subsurface stake of claim 15, wherein said shaft has a plurality of flow apertures in a water zone of said subsurface stake to discharge water into the medium when the conduit connector is connected to the source of fluid.

20. The subsurface stake of claim 15, wherein said head wall of said head of said stake body has one or more cut-out areas in cooperative arrangement with the engaging member of the pressure regulator so as to receive the engaging member in said receiving area of said head prior to engagement of the engaging member with said slot in said head wall.

\* \* \* \* \*